United States Patent [19]

Reist

[11] 4,036,356

[45] *July 19, 1977

[54] PRODUCT HANDLING EQUIPMENT FOR AN IMBRICATED PRODUCT FORMATION

[76] Inventor: Walter Reist, Schonenbergstrasse 16, 8340 Hinwil, Switzerland

[*] Notice: The portion of the term of this patent subsequent to Apr. 6, 1993, has been disclaimed.

[21] Appl. No.: 587,341

[22] Filed: June 16, 1975

Related U.S. Application Data

[62] Division of Ser. No. 411,689, Nov. 1, 1973, Pat. No. 3,948,551.

[30] Foreign Application Priority Data

Nov. 10, 1972 Switzerland .................. 16383/70

[51] Int. Cl.² ............................................. B65G 15/00
[52] U.S. Cl. .................................. 198/680; 198/685; 214/1 BA
[58] Field of Search ............... 198/179, 180, 35, 133, 198/243, 685, 680; 214/1 BA; 294/90, 99 R, 103 R, 104, 106; 24/67.1, 67.3, 67.7, 248 R, 248 C, 248 FS, 248 PC, 255 R, 255 BS, 255 AS, 255 G, 255 P, 259 PW

[56] References Cited

U.S. PATENT DOCUMENTS

| 928,172 | 7/1909 | Bernardin .................. 198/179 X |
| 1,461,760 | 7/1923 | Morinsky ..................... 198/179 |
| 2,082,240 | 6/1937 | Belluche et al. .................. 198/35 |

FOREIGN PATENT DOCUMENTS

112,491  12/1960  Netherlands .................. 198/179

Primary Examiner—Evon C. Blunk
Assistant Examiner—Douglas D. Watts
Attorney, Agent, or Firm—Werner W. Kleeman

[57] ABSTRACT

Equipment for the handling and manipulation of articles, especially printed products arriving in a fishscale or imbricated formation, comprising a multiplicity of clamps for engaging said products, each of said clamps comprising clamp jaws forming a clamp gap when the clamp is closed, the clamp jaws being movable in the extension of the clamp gap away from one another into their open position and towards one another into their closed position.

10 Claims, 11 Drawing Figures

PRODUCT HANDLING EQUIPMENT FOR AN IMBRICATED PRODUCT FORMATION

CROSS-REFERENCE TO RELATED CASE

This is a divisional application of my commonly assigned, co-pending United States application, Ser. No. 411,689, filed Nov. 1, 1973 and entitled "Clamp and Product Handling Equipment Provided Therewith", now U.S. Pat. No. 3,948,551, granted Apr. 6, 1976.

BACKGROUND AND SUMMARY OF THE INVENTION

The present invention relates to a new and improved construction of product handling equipment provided with clamping claws or clamps for seizing and holding and/or manipulating different products or articles, hereinafter simply referred to as products, by means of clamping jaws of each clamp which, when such clamp is closed, form a clamp or clamping gap.

It is a primary object of the present invention to provide an improved construction of product handling equipment provided with at least one clamp or clamping claw for the handling of the products in a safe, reliable and positive manner.

Another and more specific object of the present invention relates to an improved construction of product handling equipment incorporating a clamp having a novel coaction of the clamp with the handled product or products, especially printed products so as to afford protective handling and manipulation of such products.

Still a further object of this invention relates to improved equipment for the handling of products, such as printed products arriving in a fish-scale or overlapping staggered formation, such as newspapers, periodicals and the like, wherein such equipment is provided with a plurality of clamps for the safe, reliable and positive engagement and manipulation of the printed products.

Now in order to implement these and still further objects of the invention, which will become more readily apparent as the description proceeds, the invention is concerned with a new and improved construction of product handling equipment having clamps for engaging the products, each such clamp possessing clamping jaws which when assuming their open position move away from one another in the extension of the clamping gap and towards one another in their closing or closed position.

During operation of the clamp, the product to be seized is introduced into the opened clamp mouth and the clamp and/or the product first thereafter is rotated into a position corresponding to the desired position of the clamping gap or a position of the clamping gap determined by the shape of the product by and/or during the movement of the clamp jaws into their closed position.

By virtue of the previously mentioned constructional and functional aspects of the clamp, there are realized advantageous features which considerably exceed those prevailing with conventional fields of use of prior art clamp constructions.

BRIEF DESCRIPTION OF THE DRAWINGS

The invention will be better understood and objects other than those set forth above will become apparent when consideration is given to the following detailed description thereof. Such description makes reference to the annexed drawings wherein:

FIGS. 6 to 11 illustrate details of product handling equipment in the form of a transport device and equipped with clamps designed according to the invention for manipulating printed products, and wherein:

DETAILED DESCRIPTION OF THE PREFERRED EMBODIMENTS

Referring now to the drawings, it is to be understood that the manipulation of products, for example printed products, such as newspapers, periodicals and the like, which arrive for instance in an imbricated or overlapping fish-scale formation, similar to the arrangement of a fanned deck of cards, as is known in the newspaper or publishing art for instance, until such time as such printed products are shipped, requires complicated automated equipment which, among other things encompasses transport means for the fish-scale arrangement, package sorters, special conveying devices for the product packages, feeders for the separation of the products of the packages, cross-wise laying devices, stuffing equipment and many other types of accessory hardware. The complexity of such equipment is not in any linear relationship to its output or capacity, rather necessitates a disproportionate marked increase in the expenditure of equipment in order to increase such capacity or output. Furthermore, a difficulty which is present resides in the fact that during the course of manipulation and handling of such products the so-called pre-production part or phase of the operation must be temporarily stored, namely until there is present the main production.

It has already been proposed to seize the printed products which arrive in overlapping fish-scale formation by means of a clamp or clamping claw and thereafter to individually manipulate such products by means of such clamp. The practical realization of this proposal was faced with the problem that the available prior art clamps, which in their basic aspects correspond to conventional constructions, were complicated and accordingly expensive, voluminous and at the same time also heavy, so that the end effect in the first instance was not that the printed products had to be manipulated, rather the clamps themselves.

Figures 1, 2, 3:
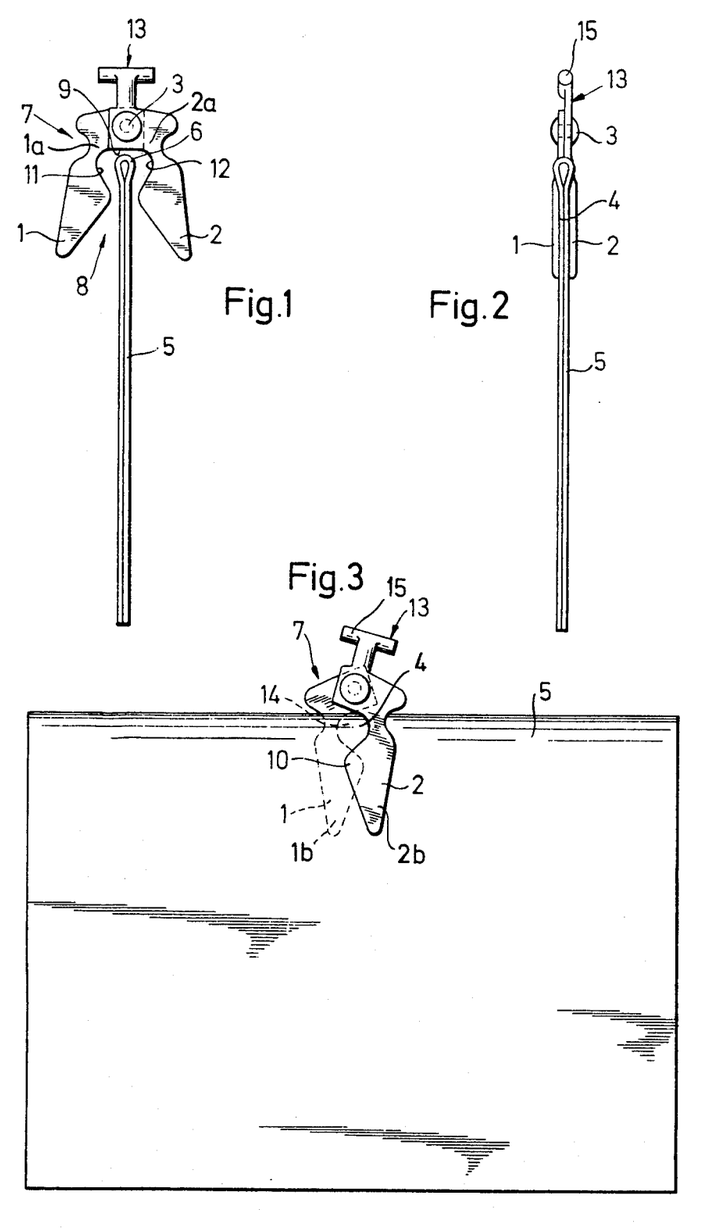
FIG. 1 is an exemplary embodiment of a clamp or clamping claw designed according to the teachings of the invention, depicted during a first operational step for seizing a folded newspaper constituting the handled product.
FIGS. 2 and 3 respectively illustrate the clamp of FIG. 1 during both of the following operational steps.
Figure 4:
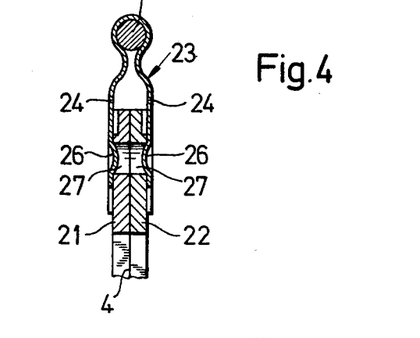
FIG. 4 is a cross-sectional view of a modified construction of clamp.

In consideration of these shortcomings, the development of this invention aims at overcoming the same. In particular, the situation is quite different for the clamp construction depicted in FIGS. 1 to 3 of this invention, particularly when the clamp jaws of the clamp move between their open position and their closed position to-and-fro in the extension of the clamping or clamp gap. For the complete functionality of such clamp, there is required, apart from the presence of the clamping jaws, only a suitable connection thereof appropriate for the contemplated relative movement. With the illustrated exemplary embodiments, the flat, blade-shaped clamp jaws 1 and 2 are hingedly connected with one another by the hinge means, as generally indicated by reference numeral 3; e.g. a pivot shaft defining a pivot axis. For forming the clamp gap 4, as shown in FIGS. 2 and 4, the clamp jaws 1 and 2 are moved toward one another out of their open position depicted in FIG. 1, until they travel past one another and partially mutually overlap, so as to assume their closed position as shown in FIG. 3. This clamp closing operation or phase, when, for instance, a newspaper 5 or the like should be seized, as has been indicated in FIGS. 1 to 3, occurs in the following manner: the one side edge, for instance the spine or folded edge 6 of the newspaper 5, is introduced into the wide opened mouth 8 of the clamp, designated in its entirety by reference character 7, and specifically preferably until this newspaper spine 6 bears against a stop 9 formed by the interconnected ends 1a and 2a of the clamp jaws 1 and 2 respectively. Starting from this position, and as best shown in FIG. 1, the clamp or clamping claw 7 and/or the newspaper 5 is turned until the clamp jaws 1 and 2 flatly bear against the newspaper 5. Viewed from the side, this further relative position of the clamp 7 and the newspaper 5 corresponds to the illustration of FIG. 2.

During and/or after the rotation of the clamp 7 or the newspaper 5, the clamp jaws 1 and 2 are brought into their closed position by carrying out what may be termed scissor-like movement in which in accordance with their form which tapers towards their free ends 1b and 2b respectively, they partially overlap at location 10 defined by projections and form the clamp gap 4 (FIG. 3). The spine 6 of the newspaper 5 is therefore located in a throughpassage or passageway designated in FIG. 3 by reference character 14, and which through-passage is formed by the recesses or inturned portions 11 and 12 of the clamp jaws 1 and 2 respectively. Owing to this construction, the spine or folded edge 6 of the newspaper 5 is not damaged by the clamp jaws 1 and 2 either during the scissor-like closing of the clamp 7 nor when the latter assumes its closed position, even though the spine 6, when the clamp is closed, is slightly bent or crimped at the region of the throughpassage 14. The newspaper 5 and the clamp 7 are now force-lockingly or frictionally connected with one another to an extent which is sufficient for effectively carrying out each manipulation, this frictional connection primarily occurring at the overlapping region 10 of the clamp jaws 1 and 2, that is at the region of the clamp gap 4, and which furthermore is intensified owing to the flat flush bearing of the clamp jaws against the thus handled product 5.

Figure 5:
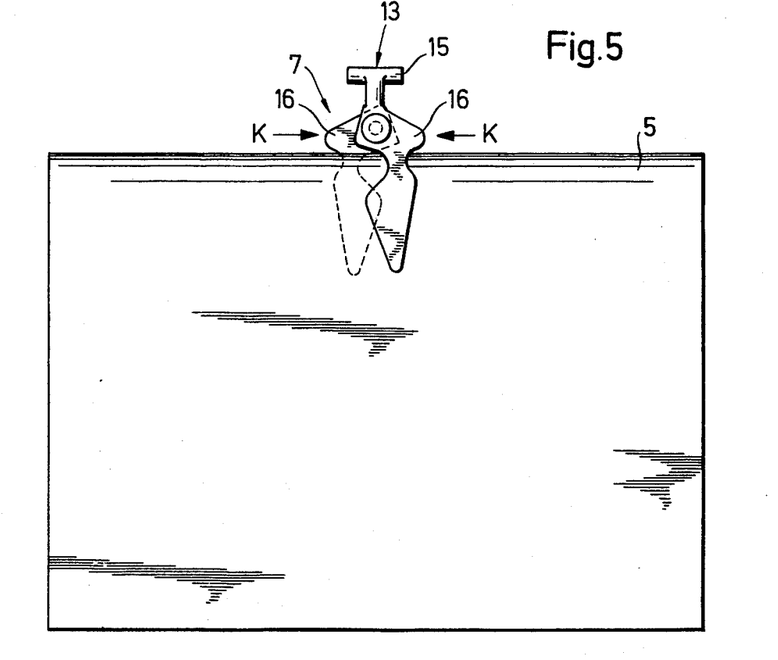
FIG. 5 illustrates the clamp of FIG. 4 in a position where it engages for instance a newspaper.
Figure 6:
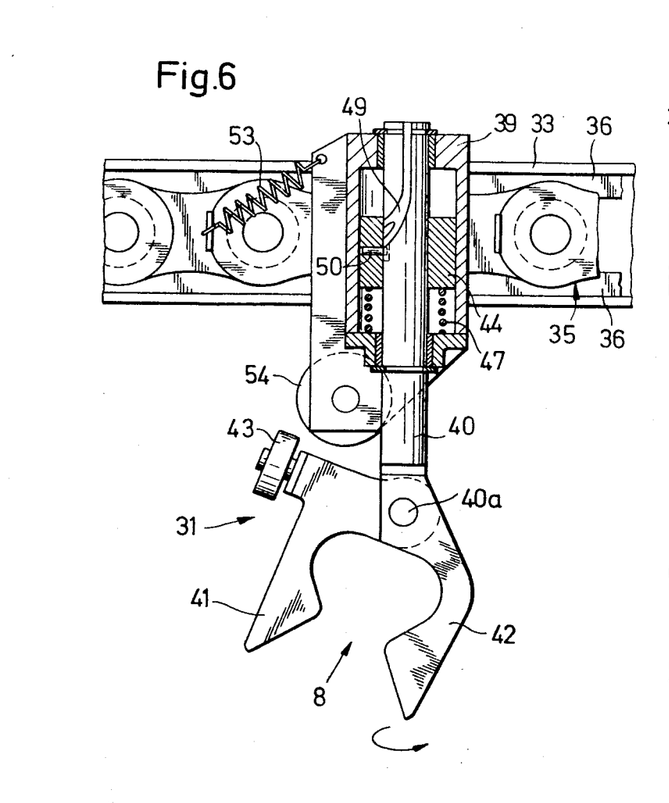
FIGS. 6 and 7 respectively illustrate a clamp which can be driven by means of a transport chain along a rail and depicted transversely and lengthwise of the rail, respectively, and shown partially in sectional view.
Figure 7:
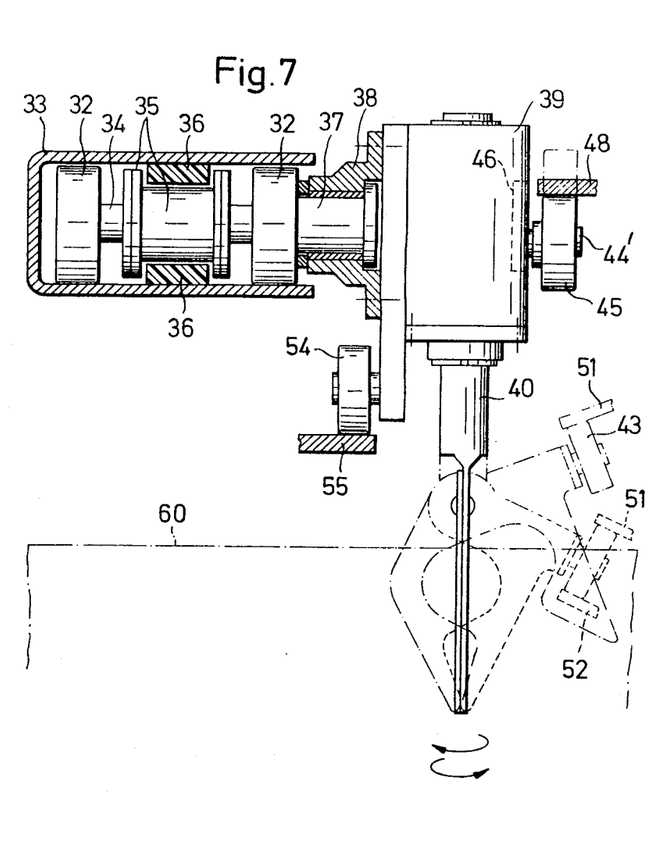

Owing to the position of the undamaged spine or folded edge 6 in the throughpassage 14, that is to say "behind" the clamp gap 4, there is produced with regard to the force-locking or frictional connection a so-called silent reserve. If it were desired to pull apart the newspaper 5 and the clamp 7, then indeed owing to this contemplated construction and coaction, the sprine 6 upon entering the clamp gap 4 would afford considerable resistance. The slight flexing or bending of the spine 6 at the region of the throughpassage 14 acts in a similar way if there is considered a lateral relative movement between the newspaper 5 and the clamp 7. In other words: once the closed clamp 7 has been placed upon the newspaper 5, then the clamp and newspaper are frictionally or force-lockingly interconnected, even if releasably, in such a positive manner that the same is sufficient for each manipulation of such product. For the manipulation of the newspaper 5 with the clamp 7, the latter possess a substantially T-shaped holding or support portion 13 which in the embodiment under consideration, is formed of one piece with the clamp jaw 2. With the embodiment according to FIGS. 1 to 3, the holding portion 13 is located with respect to the newspaper 5 in an inclined position when the clamp 7 has been brought into engagement with the newspaper. It should be understood that the clamp 7 itself, different from the position depicted in FIG. 3, could be mounted or applied at an inclination to the newspaper 5, i.e., turned in the counterclockwise direction, in order to somewhat align the holding portion 13 towards the shorter center line of the newspaper 5. However, as shown in FIG. 5, the clamp 7 can be constructed such that the holding portion 13, but also the clamp 7, can be aligned towards the shorter center line of the newspaper when the clamp is placed upon such newspaper.

The beam 15 of the substantially T-shaped holding portion or support 13, in the case under consideration, is constructed at both of its end sections cylindrically or otherwise such that the holding portion 13 can be guided for instance in a hollow guide rail of, for instance, substantially C-shaped cross-sectional configuration. Joining together of the clamp 7 and the newspaper 5 can occur at the first opportunity afforded to do so in such a way that already at the region of the fish-scale formation of products which arrive from the rotary printing machine a clamp is applied to each of the thereat present newspapers. For this purpose, the products which are for instance in fish-scale overlapping formation could be guided over an arch or dome at the region of which they open in fan-like manner, the spine of the newspapers then being freely exposed or presented to the clamp. At the region of such arch or dome the clamps could be delivered out of a magazine, along a path or track which converges with the path or track of the fish-scale product stream, the clamps with their wide open clamp mouth penetrating into the path of travel of the newspapers and being overtaken by such newspapers. In this way the spine of each newspaper arrives at the mouth of the associated clamp which then can be closed in the already described manner. The entire procedure occurs of course with uninterrupted further movement of the fish-scale product stream, this also being the case with respect to the rotation and closing of the clamp. The clamp closing operation can be brought about through the application of an external force K (FIG. 5) which can engage with closing cams or dogs 16 of the clamp jaws 1 and 2 defining clamp arms. Such forces can be generated for instance owing to rotation of the clamp at the region of guide tracks or ramps, yet they can also be generated by special appropriately arranged actuation devices. Further, it would be possible to equip both clamp jaws with a holding portion and to apply the closing force (also however the opening force) thereto, for instance by means of the guide rail.

An imbricated or fish-scale overlapping product stream equipped in this manner with clamps so-to-speak consists of individualized, single manipulatable newspapers. This does not, however, preclude manipulating the newspapers —at least temporarily— in an assembly or group. If it is supposed that the fish-scale overlapping product stream is equipped with such clamps or clamping claws, and the holding portions are guided in a rail extending in the flow direction of the fish-scale product stream or are arranged at a chain, possibly detachably if desired, then it is conceivable to transform the fish-scale overlapping product stream directly into a stack-like formation in which the newspapers, after there has been removed therefrom the support carrying the fish-scale product stream, hang down from the rail. They now can be further transported in this formation —which can be considered as a type of reposed or hanging stack— along the rail or at the same time together at least with sections thereof. It is in fact conceivable to provide a flexible rail, if desired, an endless revolving rail, which moves in its lengthwise direction, at which the clamps are displaceably guided —this in particular in consideration of bringing such together with the newspapers— which however simultaneously functions as the entrainment means for the clamps. It is, however, also possible to contemplate the provision of rail sections which, as soon as they are filled with a corresponding number of clamps, move to one side and leave in their place an empty space for rail sections which are still to be filled. The filled rail sections can be directly further manipulated or however delivered to an intermediate storage. It should be understood that as soon as the fish-scale overlapping product formation is transformed into the form of a stack which hangs down from the rail or a rail section, there is then possible a compaction operation, that is to say, a pushing together of the clamps. In any event, it is clear that after providing the fish-scale product formation with the clamps, it is possible to undertake the transformation of the products into stack form without any additional automated equipment. The possibility of equipping the fish-scale overlapping product formation with clamp —as should be clearly apparent from what has been discussed— is rendered possible due to the particular construction and functional characteristics of the previously described clamp which, mentioning only one aspect, possesses a large mouth opening 8, is self-clamping and self-holding and in relation to the thickness of the non-clamped newspapers is practically of no significance, and accordingly can find space both in the fish-scale product formation as well as (with constant space requirements) in a stack and which furthermore possess such a low weight that such —if this is necessary— can be itself supported and held by the newspapers themselves.

The transformation of the fish-scale overlapping product formation into the form of a reposed or lying stack —as this expression is to be understood — is reversible. Indeed, such a stack and the newspapers which are located therein and which hang down from the rail can be laid out in a fish-scale formation on a support surface, specifically both in the original fish-scale form as well as also in the form of a reversed fish-scale formation. On the other hand, it is possible to break-up the lying stack, for instance into counted-out packages or into individual newspapers. The packages can be readily delivered, for instance, to a binding machine or to a shipping station. The dissolution of a reposed stack into individual product copies would be, for instance, of importance in conjunction with the stuffing thereof or grouping together, that is to say, for the situation where from the copies resulting from the pre-production together with those from the main production, i.e., from a number of partial products the same are to be grouped together into newspapers, books and the like. Since also these copies emanating from the main production in each case hang at a clamp, they can be easily opened for stuffing purposes. For the breaking-up or dissolution of a lying stack into packages or individual copies, in any case for moving the clamps or the newspapers in groups or individually, there could be provided entrainment means of any type which engage with the clamps and/or with their holding components or parts. The entrainment means can be driven or operated mechanically, hydraulically, pneumatically or electrically. It is for instance readily possible to drive the clamps, at least through certain sections or paths, in the manner of a linear motor.

At the appropriate time the clamps are opened, i.e. are released from the newspapers by simply initially moving the clamp jaws in a scissor-like manner away from one another and finally into their open position, and these clamps, either before or after possibly placing said in a magazine, are returned to that location at which they are again brought into use. Opening of the clamps can occur for instance in such a manner again that appropriate devices, such as for instance guide tracks arranged at the path of movement of the clamps or movable relative thereto, engage with the appropriately constructed closing cams or dogs 16. Furthermore, it is to be appreciated that the hinge means or pivot shaft 3 defines a pivot axis for the clamp jaws 1, 2 which pivot axis extends substantially perpendicular to a plane in which the clamp jaws carry out their previously discussed scissor-like movement.

The described clamps of the construction depicted and discussed in conjunction with FIG. 1 also can engage with newspapers of different thicknesses within predetermined limits. These limits can be extensively enlarged if the clamp jaws possess a certain resilient flexibility or are supported relative to one another with such flexibility. For instance, it is possible to design a clamp with an accommodatable or adjustable clamp gap, for instance according to the structure disclosed in FIG. 4. In this case both of the clamp jaws, designated by reference characters 21 and 22, and defining clamping arms are hingedly connected with one another by an essentially U-shaped holding portion 23 which functions in the manner of a hairpin spring, the hinge connection being such that the legs 24 of the holding portion 23 with their bulbous-shaped projections or protuberances 26 engage with aligned holes 27 of the clamp jaws 21 and 22 respectively. These clamp jaws 21 and 22 thus can appropriately widen the holding portion 23 depending upon the thickness of the newspaper or other product to be seized. At its apex or top region, the holding portion 23 encompasses a cylindrical transverse beam 25 which is offset at the region of the wrapped around portion and thus secured against displacement in its own lengthwise direction. With this embodiment, as well as also with the first described embodiment, the clamp arms can be held in their open position solely due to friction or however also with the help of engagement member or the like. Corresponding measures in the closed position of the clamp are not necessary.

Such clamps render possible of course the manipulation of other articles than printed products. This is for instance the case for empty or filled packages, files, books and so forth. It is possible to not only engage with such clamps flat articles or articles possessing flat-like portions, but it is also possible to seize articles of all types and shapes. In any event, the clamp is capable of fulfilling its objectives with a very small expenditure in relation to the volume and weight of the article. In each instance, the articles can be individualized and easily rendered manipulatable. This circumstance complements the completely automatic processing of the articles. In fact, in this regard the exemplary embodiment described in detail concerning printed products is most illustrative. The described clamp renders possible the completely automated manipulation of, for instance newspapers or periodicals, from the rotary printing press up to the time of loading and shipment.

Figure 8:
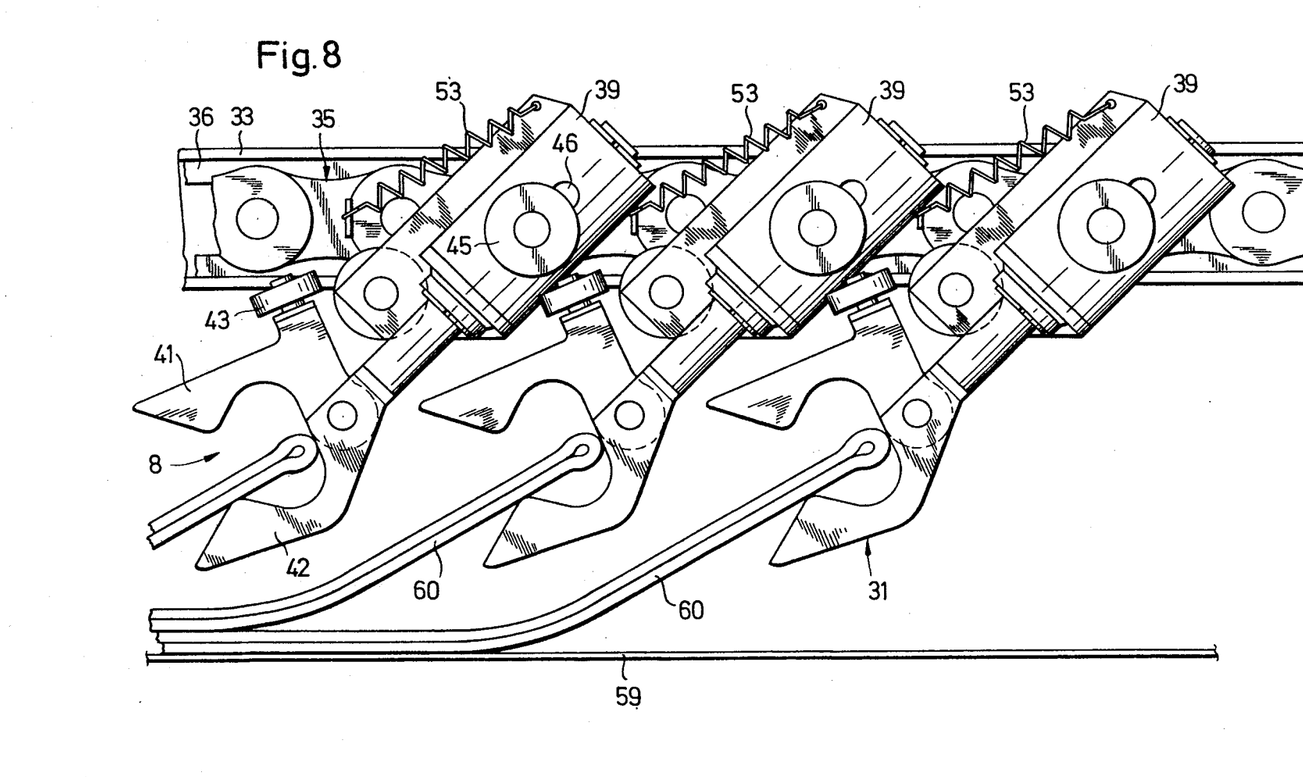
FIG. 8 illustrates a section of the transport device with clamps constructed according to FIGS. 6 and 7 during an operating step corresponding to FIG. 1.
Figure 9:
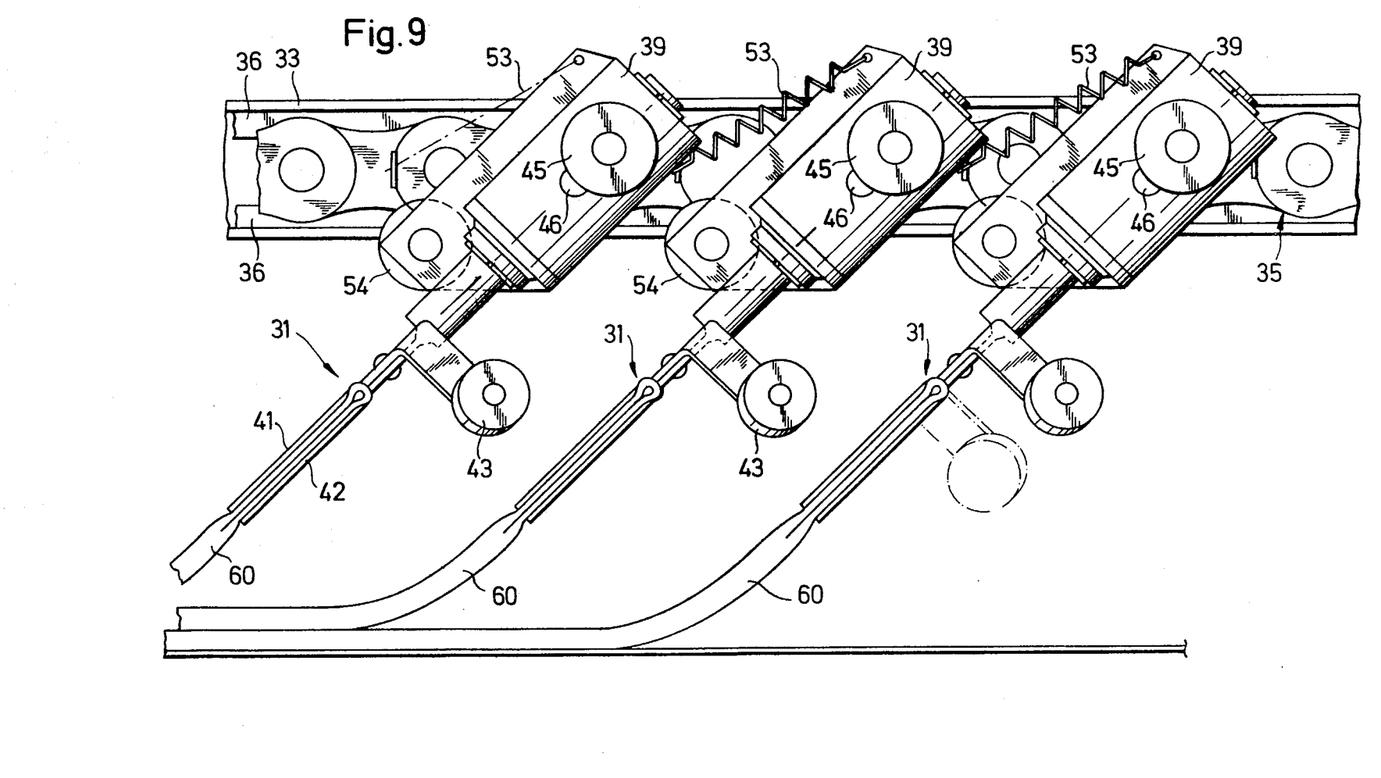
FIG. 9 illustrates the arrangment of FIG. 8 during the following operating step or phase.
Figure 10:
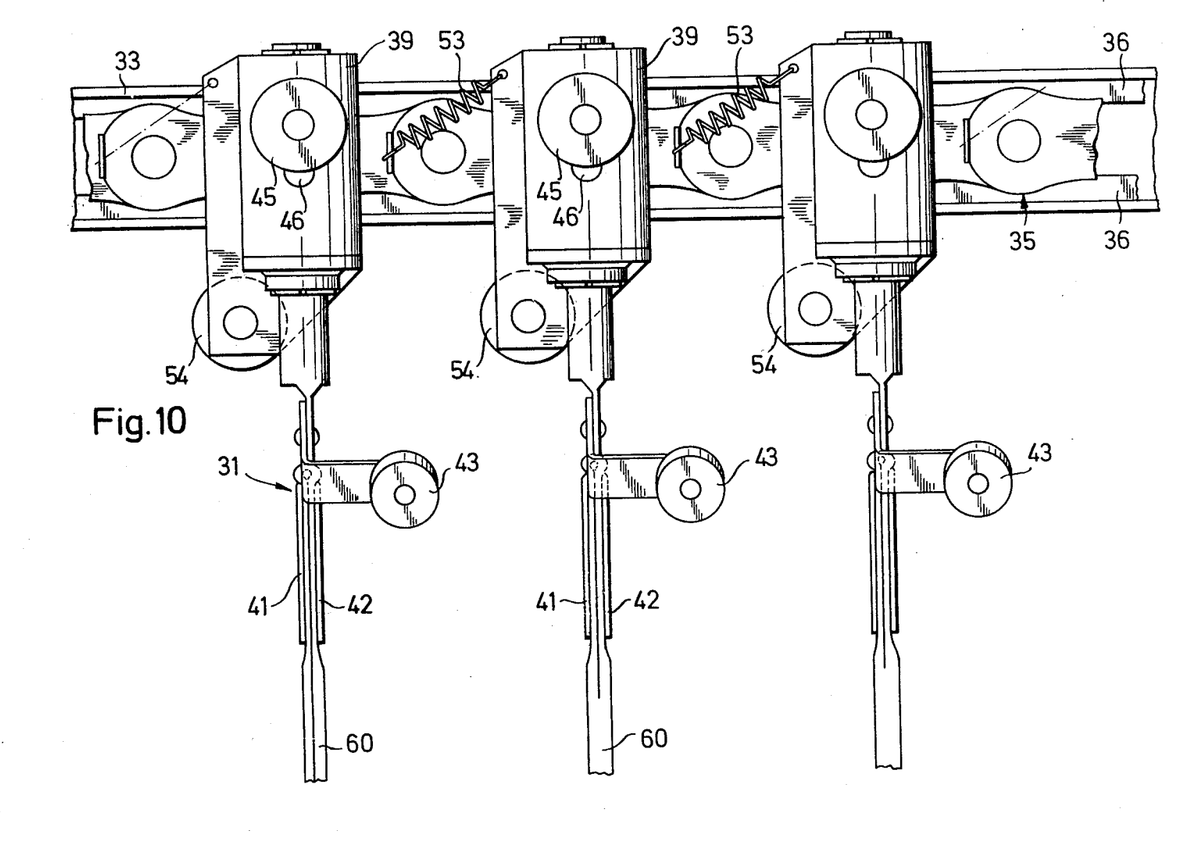
FIG. 10 illustrates the arrangement of FIG. 8 during the product transport phase.

FIGS. 6-11 inclusive illustrate a possible exemplary embodiment of a transport device for printed products which arrive in the aforementioned fish-scale overlapping formation, such as newspapers and the like. This transport device possesses a number of clamp claws or clamps, here designated in their entirety by reference character 31 and which clamps are guided by means of travelling springs 32 or equivalent means in a rail 33 of substantially U-shaped cross-sectional configuration and which opens towards one side, as shown. The travelling springs 32 are mounted at a drive or universal-joint shaft 34 of a link chain 35, also referred to as the transport chain, and which is laterally guided in the rail 33 by guide ledges 36. A projection 37 of the universal-joint or hinge shaft 34 extends laterally out of the rail 33 and thus serves for the articulated anchoring of the associated clamp 31. The projection 37 is connected by means of a flange 38 with a bearing or support housing 39 in which there is rotatably mounted a shaft 40 carrying the clamp jaws or amrs 31 and 42. Shaft 40 is fixedly connected with the one clamp jaw or arm 42 and hingedly connected at 40a with the other clamp jaw or arm 41. The last-mentioned clamp arm 41 additionally carries an actuation roller or member 43. The shaft 40 piercingly extends through a control bushing or sleeve 44 which is axially displaceably mounted in the housing 39, this control bushing 44 carrying a control roller or roll 45 through the agency of a radial pin 44′, as best seen by referring to FIG. 7. The pin 44′ is guided in a slot 46 of the housing 39, as shown in FIG. 8, so that the control bushing or sleeve 44 is secured against rotation. For the axial displacement of such control bushing 44 against the action of a spring 47 (FIG. 6), there are provided control cams or tracks (rocker arms or equivalent structure) which, as clearly illustrated by reference character 48 in FIG. 7, engage with the control roller or roll 45. The shaft 40 possesses a control groove or slot 49 (FIG. 6) which extends partially over the periphery of such shaft and with which control groove 49 engages a radial pin 50 of the control bushing 44.

Figure 11:
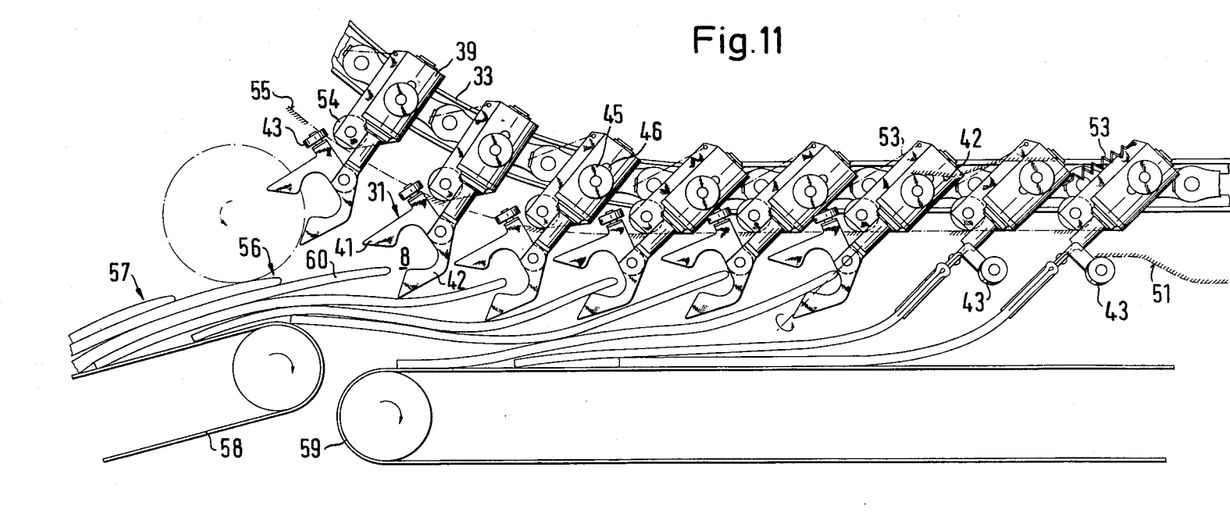
FIG. 11 illustrates the equipment in a manner corresponding to the showing of FIG. 8, however illustrating a longer transport section thereof.

Hence, as such should be readily apparent from this disclosure, displacement of the control bushing 44 brings about a corresponding rotation of the shaft 40 which is supported in axial direction. After such rotation out of the position depicted in FIG. 6 into that depicted in FIG. 7, the actuation roller 43 of the clamp 31 arrives at the region of the control cams or tracks which, as indicated by reference characters 51 and 52 respectively in FIG. 7, bring about the scissor-like closing and opening respectively of the clamp. According to the showing of FIGS. 6 and 7, the clamp extends downwardly perpendicular to the rail 33 under the action of a spring 53. Under the action of this spring, the clamp can be folded or shifted with the help of a support roller 54 when the same travels past ascending portions of the associated control cams, as for instance indicated by reference character 55 in FIG. 7. As already mentioned and has been illustrated by reference numeral 56 in FIG. 11, the fish-scale product formation 57 is guided by means of the transport belts or bands 58 and 59 over an arched or domed region, so that the leading edges of the newspapers 60 are exposed and accessible to the associated clamps 31. The clamps in turn at this location are guided in a path which converges with that of the fish-scale overlapping product formation 57, so that they arrive in the position necessary for engaging with the newspapers. For the engagement thereof, the leading edges of the newspapers must penetrate into the opened clamp mouth 8. For producing an appropriate relative speed between the newspaper and clamp, the latter —as shown in FIG. 11— can be shifted towards the rear with respect to the transport direction with the aid of the support roler 54. After the newspapers arrive in the position discussed previously in conjunction with FIG. 1 (see also FIG. 8) the clamp jaws or arms 41 and 42 are applied to the newspaper with the aid of the control roller 45 and brought into their closed position with the aid of the actuation roller 43, as best seen by also referring to FIG. 9. Consequently, the newspapers 60 ae individually seized and manipulatable. The transport device now can leave the region of the conveying band 59. During this transport phase there can be dispensed with the support of the clamps by means of the support rollers 54, so that the newspapers depend freely downwardly from the transport chain. By reversing the aforementioned measures it is possible to again form a fish-scale overlapping product formation or arrangement.

The rotation and closing of the clamps can —as already stated— occur with more or less extensive superimposing of such two movements, and specifically not merely exclusively through a corresponding arrangement of the control cams or tracks associated with the control rollers 54 and the actuation rollers 43, rather also by virtue of such construction of clamp mechanism wherein —again with the help of control grooves and the like— the displacement of a single roller brings about both a rotation as well as also the closing of each clamp.

While there is shown and described present preferred embodiments of the invention, it is to be distinctly understood that the invention is not limited thereto, but may be otherwise variously embodied and practiced within the scope of the following claims. Accordingly,

What is claimed is:

1. Equipment for the handling and manipulation of articles, especially printed products arriving in fish-scale formation, comprising a multiplicity of clamps for engaging said products, means for operatively connecting said multiplicity of clamps with one another, each of said clamps comprising clamp jaws having clamping surfaces for engaging a product, said clamp jaws forming a clamp gap when the clamp is closed, means for pivotably mounting said clamp jaws of each clamp about a pivot axis, said clamping surfaces being substantially perpendicular to said pivot axis, the clamp jaws of each clamp being pivotable in planes substantially perpendicular to said pivot axis in a substantially scissor-like manner at the region of the clamp gap away from one another into their open position and towards one another into their closed position, the scissor-like pivoting of said clamp jaws into their closed position causing gripping engagement of said clamping surfaces with the article.

2. The equipment as defined in claim 1, said connecting means including a rail, transport means guided at said rail, means for hingedly anchoring said clamps at the transport means.

3. The equipment as defined in claim 2, wherein the clamps are equipped with support rolls arranged at a spacing from said anchoring means, means cooperating with such support rolls for controlling said support rolls.

4. The equipment as defined in claim 2, further including a housing for each of the clamps and anchored with the transport means, and means for rotatably mounting each clamp in it associated housing.

5. The equipment as defined in claim 4, wherein each of the clamps incorporates a shaft engaging into its associated housing, a central cam, each shaft being coupled with a rotary drive actuatable by said control cam.

6. The equipment as defined in claim 5, wherein each clamp jaw defines a clamp arm, and wherein at least one of the clamp arms of each clamp is coupled with a closing mechanism actuated by means of said control cam.

7. The equipment as defined in claim 6, wherein the rotary drive and the closing mechanism are coupled with one another.

8. Equipment for the handling and manipulation of articles, especially printed products arriving in fish-scale formation, comprising a multiplicity of clamps for engaging said products, means for operatively connecting said multiplicity of clamps with one another, each of said clamps comprising clamp jaws forming a clamp gap when the clamp is closed, means for pivotably mounting said clamp jaws of each clamp, the clamp jaws of each clamp being movable in a substantially scissor-like manner at the region of the clamp gap away from one another into their open position and towards one another into their closed position, means for moving the products in a substantially fish-scale overlapping formation along a predetermined path of travel, said operatively connecting means for said clamps including guide means, said clamps being movably guided in said guide means which converge with respect to the path of travel of the fish-scale overlapping printed product formation, said clamps being movably guided in said guide means in the flow direction of the fish-scale overlapping product formation and driven in such a manner that the spine of the printed products successively engage into the mouth of an associated clamp, and means for moving the clamps in their closed position.

9. The equipment as defined in claim 8, further including means arranged along the course of the guide means for opening the clamps.

10. The equipment as defined in claim 9, wherein said guide means comprises rail means.

* * * * *